United States Patent
Tanaka et al.

(10) Patent No.: US 9,201,289 B2
(45) Date of Patent: Dec. 1, 2015

(54) IMAGE CAPTURE APPARATUS IN WHICH AN ARRANGEMENT RELATIONSHIP BETWEEN AN IMAGE SENSOR AND A MICROLENS ARRAY CAN BE VARIED, AND METHOD FOR CONTROLLING THE SAME

(71) Applicant: CANON KABUSHIKI KAISHA, Tokyo (JP)

(72) Inventors: Eiichi Tanaka, Yokohama (JP); Takayuki Komatsu, Yokohama (JP); Keiichi Saito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 19 days.

(21) Appl. No.: 14/141,864

(22) Filed: Dec. 27, 2013

(65) Prior Publication Data

US 2014/0184885 A1  Jul. 3, 2014

(30) Foreign Application Priority Data

Dec. 28, 2012  (JP) .................... 2012-288757

(51) Int. Cl.
*G03B 13/00* (2006.01)
*H04N 5/225* (2006.01)
*G03B 13/36* (2006.01)
*H04N 5/232* (2006.01)
*H04N 5/369* (2011.01)
*G02B 3/00* (2006.01)

(52) U.S. Cl.
CPC .............. *G03B 13/36* (2013.01); *G02B 3/0056* (2013.01); *H04N 5/2254* (2013.01); *H04N 5/23209* (2013.01); *H04N 5/23212* (2013.01); *H04N 5/3696* (2013.01)

(58) Field of Classification Search
USPC ................. 348/350–351, 357, 340, 360–361; 359/619, 622
See application file for complete search history.

(56) References Cited

U.S. PATENT DOCUMENTS

| 5,850,310 | A  | * | 12/1998 | Schweizer | ................ | 359/622 |
| 8,094,999 | B2 | * | 1/2012 | Ohnishi | ...................... | 396/113 |
| 8,237,097 | B2 | * | 8/2012 | Iwane | .................... | 250/201.2 |
| 8,243,189 | B2 | * | 8/2012 | Kusaka | ........................ | 348/350 |
| 8,488,214 | B2 | * | 7/2013 | Kaise | ........................... | 358/474 |
| 8,526,807 | B2 | * | 9/2013 | Iwane | ........................... | 396/113 |

(Continued)

FOREIGN PATENT DOCUMENTS

JP  2010-102230 A  5/2010

OTHER PUBLICATIONS

Ren Ng, et al. Light Field Photography with a Hand-held Plenoptic Camera, Stanford Tech Report CTSR, Feb. 2005, Apr. 20, 2005, Cited in paragraph [0002] spc.

*Primary Examiner* — Ngoc-Yen Vu
(74) *Attorney, Agent, or Firm* — Cowan, Liebowitz & Latman, P.C.

(57) ABSTRACT

Disclosed are an image capture apparatus in which an arrangement relationship between an image sensor and a microlens array that is arranged in front of the image sensor can be varied, and a method for controlling the same. In a state in which a photographic lens including the microlens array is attached, information on the photographic lens and information on the image sensor are used to control a distance between the microlens array and the image sensor, and an aperture value. The microlens array or the image sensor is shifted so that they are arranged at this distance, and the aperture value is set.

18 Claims, 6 Drawing Sheets

(56) References Cited

U.S. PATENT DOCUMENTS

| | | | |
|---|---|---|---|
| 8,680,451 B2* | 3/2014 | Iwane | 250/206.1 |
| 2007/0053673 A1* | 3/2007 | Seo et al. | 396/111 |
| 2014/0211077 A1* | 7/2014 | Ng et al. | 348/349 |
| 2014/0232897 A1* | 8/2014 | Iwane | 348/222.1 |
| 2015/0138402 A1* | 5/2015 | Ng et al. | 348/240.3 |

* cited by examiner

F I G. 5
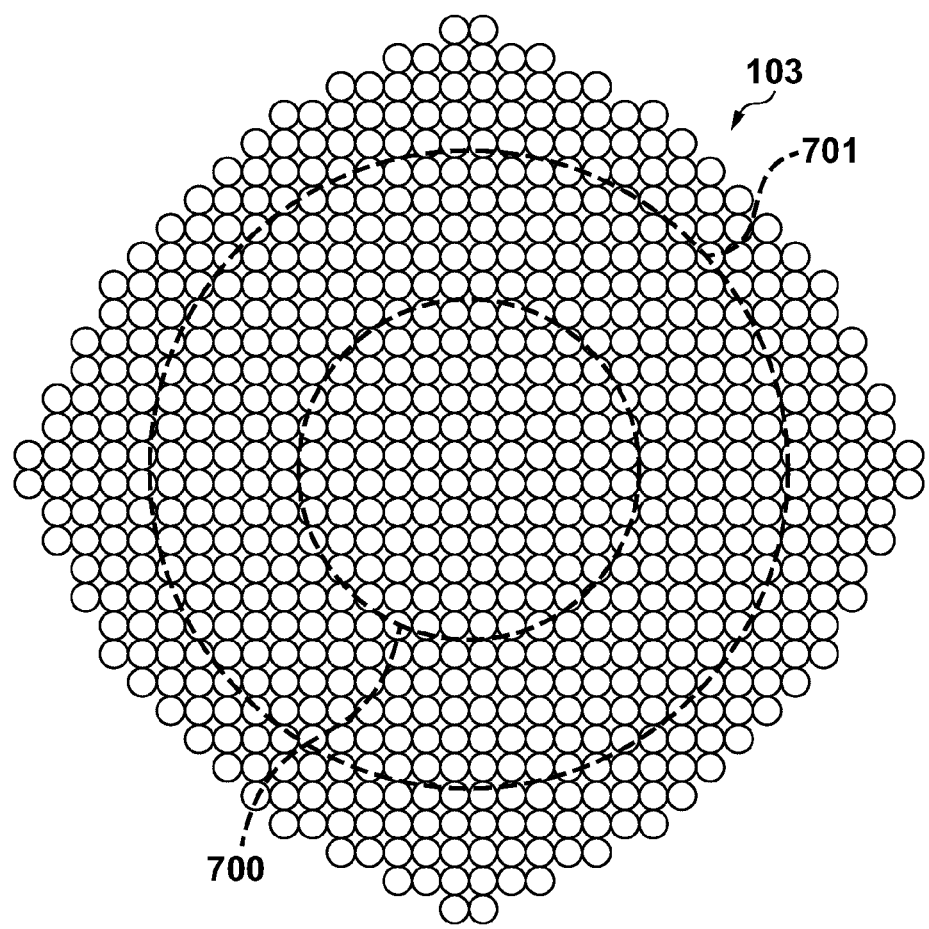

IMAGE CAPTURE APPARATUS IN WHICH AN ARRANGEMENT RELATIONSHIP BETWEEN AN IMAGE SENSOR AND A MICROLENS ARRAY CAN BE VARIED, AND METHOD FOR CONTROLLING THE SAME

BACKGROUND OF THE INVENTION

1. Field of the Invention

The present invention relates to an image capture apparatus and a method for controlling the same, and in particular to an image capture apparatus that can generate refocusable image data after having captured an image, and a method for controlling the same.

2. Description of the Related Art

In recent years, image capture apparatuses that record not only the integrated intensity of light incident on a pixel location but also the intensities of light incident on a pixel location in respective incident directions have been proposed, and are referred to as "light field cameras" and the like (Ren. Ng et al. "Light Field Photography with a Hand-Held Plenoptic Camera", Stanford Tech Report CTSR 2005-02, Apr. 20, 2005). For example, by arranging a microlens array between a photographic lens and an image sensor so that an outgoing light flux of one microlens is received by a plurality of pixels of the image sensor, it is possible to obtain the intensities of light that was incident on the microlens from a different direction with each pixel.

A pixel signal (ray information) that was obtained in such a manner includes information on the intensities of the incident light in the respective directions at the position of the microlens. Therefore, a method that is called "Light Field Photography" can be applied to reconstruct an image in which a given imaging plane is focused (hereinafter, referred to as "refocused image"). Also, by adding together signals obtained with the plurality of pixels that have received the outgoing light flux of one microlens, it is possible to obtain a normal photographic image that has the same number of pixels as the number of microlenses. In the present specification, an image from which a refocused image can be reconstructed is referred to as a "light field image".

In this method, information on one pixel of the reconstructed image (refocused image) is generated based on the information obtained with the plurality of pixels that have received the outgoing light flux of one microlens, and thus the pixel count of the reconstructed image is less than the total pixel count of the image sensor. The pieces of information obtained by the plurality of pixels are also combined to generate one pixel when generating a normal image which is not a light field image, and thus the image obtained will have a smaller pixel count than that of an image obtained by a normal camera using the same image sensor. That is to say, a conventional light field camera has a configuration just for photographing light field images, and normal images are situated as images that correspond to the position of a particular imaging plane of the light field image. Accordingly, performance in photographing a normal image, which is not refocusable, is inevitably deteriorated.

In order to solve such a problem, Japanese Patent Laid-Open No. 2010-102230 proposes a configuration of a lens-interchangeable camera in which a detachable microlens array is arranged at a joint part between an interchangeable lens and the camera. By employing a detachable microlens array, a light field image can be photographed only when the microlens array is attached, and a normal image that has the same pixel count as that of an image sensor at a maximum can be photographed, when the microlens array is detached.

In the conventional technology disclosed in Japanese Patent Laid-Open No. 2010-102230, an arrangement relationship between the microlens array and the image sensor is fixed, irrespective of the interchangeable lens or the image capture apparatus. Therefore, it is impossible to associate the microlenses with the pixels depending on differences in the size and the pixel count of image sensors included in image capture apparatuses.

SUMMARY OF THE INVENTION

The present invention was made in view of such a problem of the conventional technology, and provides an image capture apparatus in which an arrangement relationship between an image sensor and a microlens array that is arranged in front of the image sensor can be varied, and a method for controlling the same.

According to an aspect of the present invention, there is provided an image capture apparatus having an image sensor in which a plurality of photoelectric conversion elements are arranged, the image capture apparatus comprising: an obtaining unit configured to obtain, from a photographic lens that includes a lens array and is attachable to and detachable from the image capture apparatus, information on the photographic lens; and a control unit configured to give an instruction to shift the lens array or the image sensor, so that the lens array and the image sensor are arranged at a distance based on the information on the photographic lens, in a state in which the photographic lens is attached, wherein the distance between the lens array and the image sensor is determined such that an outgoing light flux from each of lenses that constitute the lens array is incident on a predetermined number of the photoelectric conversion elements of the image sensor, the predetermined number being two or more.

Further features of the present invention will become apparent from the following description of exemplary embodiments (with reference to the attached drawings).

BRIEF DESCRIPTION OF THE DRAWINGS

FIG. 5 is a diagram illustrating a relationship between the positions of the microlens array in an optical axis direction and light receiving regions.

DESCRIPTION OF THE EMBODIMENTS

First Embodiment

Hereinafter, the present invention will be described in detail based on exemplary embodiments with reference to the attached drawings.

Figure 1:
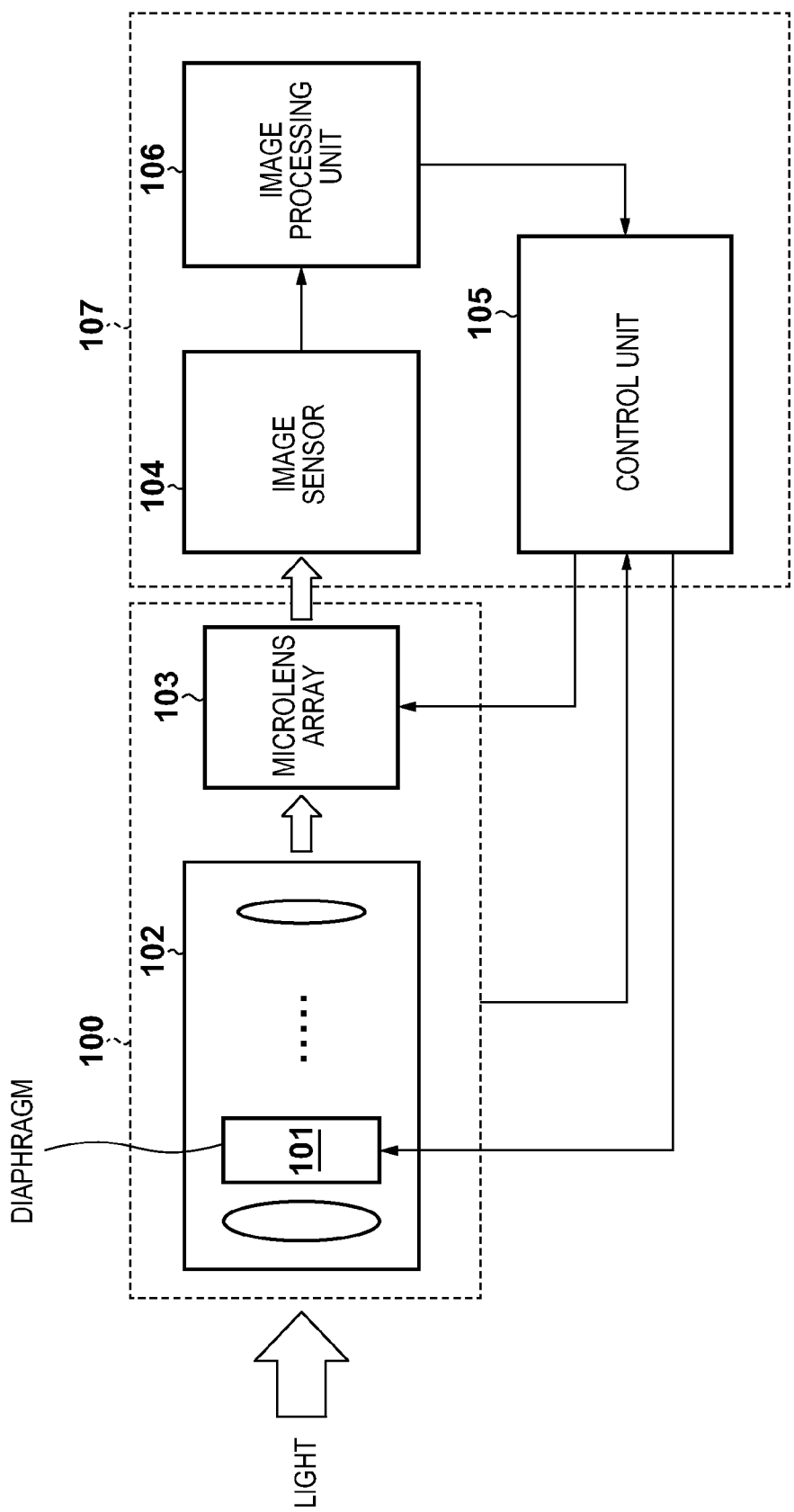
FIG. 1 is a block diagram illustrating an example of a configuration of an image capture apparatus according to a first embodiment of the present invention.

FIG. 1 is a block diagram illustrating an example of a configuration of an image capture apparatus according to a first embodiment of the present invention, and shows a state in which the traveling direction of light rays is seen from the side.

The image capture apparatus of the present embodiment is of a lens-interchangeable type, and is constituted by an interchangeable lens 100 serving as a photographic lens, and a main body 107. The interchangeable lens 100 and the main body 107 are configured to be detachable via lens mounts respectively provided on the interchangeable lens 100 and the main body 107. Signal communication between the main body 107 and the interchangeable lens 100 that is shown in FIG. 1 is generally performed via electric contacts provided on the lens mounts, but the communication may be performed by other methods such as contactless communication.

The interchangeable lens 100 includes a lens unit 102 and a microlens array 103, and is configured such that light that exits the lens unit 102 is incident on the microlens array 103.

The lens unit 102 is provided with a plurality of lenses including a focus lens. The lens unit 102 also includes a diaphragm 101, and the aperture size of the diaphragm 101 can be controlled by a control unit 105 of the main body 107. Controlling the aperture size of the diaphragm 101 allows the maximum incident angle of light that exits the lens unit 102 to be controlled, and it is possible to reduce this maximum incident angle as the aperture is made smaller.

The microlens array 103 is an array in which a plurality of microlenses are arranged two-dimensionally, and in the present embodiment, the microlens array 103 is configured to be movable in parallel to an optical axis. A mechanism for driving the microlens array 103 may be similar to a mechanism for driving the focus lens, for example, and a well-known configuration is applicable to the mechanism, and thus a description thereof is omitted.

The interchangeable lens 100 also includes driving sources, such as motors and actuators, for driving the focus lens and a variable magnification lens that are included in the lens unit 102, the diaphragm 101, and the microlens array 103, and the driving sources drive these constituent components in accordance with control of the control unit 105. Power is supplied to the driving sources from, for example, the main body 107 via the lens mounts.

Light that has passed through the microlens array 103 is converted into an electric signal by the image sensor 104 in which photoelectric conversion elements are arranged two-dimensionally. As described above, instead of the microlenses that constitute the microlens array 103 corresponding to the photoelectric conversion elements of the image sensor 104 in a one-to-one relationship, one microlens corresponds to a plurality of photoelectric conversion elements (pixels). Image synthesis processing is applied to the converted electric signal in an image processing unit 106, and image data is generated.

The control unit 105 receives the image data and information on the image sensor 104 from the image processing unit 106, and information on the interchangeable lens from the interchangeable lens 100, and controls the position of the microlens array 103 and the aperture of the diaphragm 101. In addition, the control unit 105 controls the constituent components of the main body 107 in accordance with an instruction from a user via an operation unit (not shown), various types of detection results, analysis results, and the like. In the present embodiment, the user can set, as photographic modes, at least two modes, i.e., an image quality priority mode and a refocusing priority mode. The control unit 105 switches control of the constituent components in accordance with the mode setting configured by the user.

The following will describe operations for controlling the microlens array 103 and the diaphragm 101 that are performed by the control unit 105 according to the present embodiment in detail with further reference to FIGS. 2A to 5.

Figure 2A:
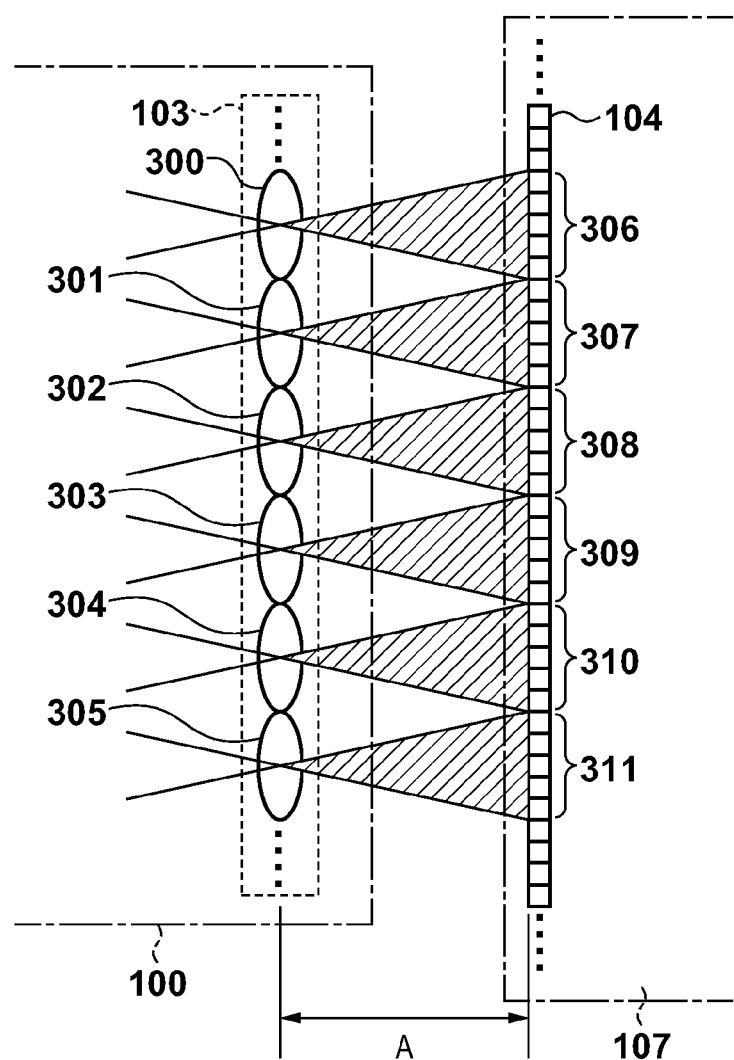
FIG. 2A is an enlarged view of the vicinity of a microlens array 103 and an image sensor 104 of FIG. 1.

FIG. 2A is an enlarged view of the vicinity of the microlens array 103 and the image sensor 104 of FIG. 1. Here, for the sake of convenience, a description of some of the microlenses of a microlens column arranged in the vertical direction, from among the two-dimensional microlens array 103, and a partial region of the image sensor 104 that corresponds to the some microlenses is given.

Figure 2B:
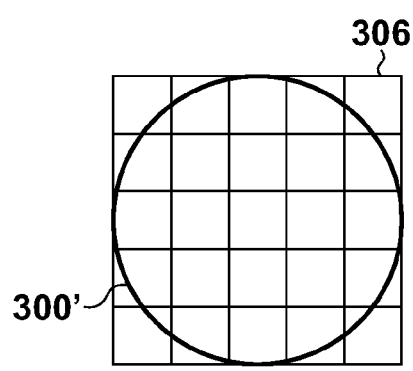
FIG. 2B is a diagram illustrating a positional relationship between an outgoing light flux of a microlens 300 and a photoelectric conversion element group 306 that corresponds to the microlens 300.

Microlenses 300 to 305 show some of the microlenses of a microlens column arranged in the vertical direction, among the two-dimensionally arranged microlenses constituting the microlens array 103. Photoelectric conversion element groups 306 to 311 show pixel groups that correspond to the microlenses 300 to 305, among the pixels arranged two-dimensionally in the image sensor 104. Note that, although in FIG. 2A, the photoelectric conversion element groups 306 to 311 are shown one-dimensionally, they are actually arranged two-dimensionally as shown in FIG. 2B.

In the drawings, "A" represents the distance between the centers of the cross sections of the lenses of the microlens array 103 and the image sensor 104. Also, portions with diagonal lines in the drawings show spreads of outgoing light fluxes of the microlenses 300 to 305.

FIG. 2A shows the case where the combination of the distance A between the image sensor 104 and the microlens array 103 and the size of the aperture (aperture value) of the diaphragm 101 is in the most appropriate state. The most appropriate state refers to a state in which spreads of outgoing light fluxes of adjacent microlenses do not overlap each other, and the number of photoelectric conversion elements that correspond to one microlens is a predefined value. In order to obtain a good image quality, it is essential that overlap (cross talk) of the spreads of the outgoing light fluxes does not occur. Note that, as shown in FIG. 2A, a larger spread of an outgoing light flux of a microlens without overlapping spreads of outgoing light fluxes of the adjacent microlenses achieves efficient use of the pixels.

Note that a plurality of photoelectric conversion elements that "correspond" to one microlens refers to a group of photoelectric conversion elements included in a region that has a predetermined size and encompasses a region on the image sensor that is formed by the outgoing light flux of the microlens. As shown in FIG. 2B, when an outgoing light flux of a microlens forms a circular region 300' on the image sensor, the group of photoelectric conversion elements refers to a group of photoelectric conversion elements that are included in, for example, a bounding rectangle region of the circular region 300'.

FIG. 2B is a diagram illustrating the positional relationship between the range (spread of the outgoing light flux) 300' on the image sensor 104 on which the outgoing light flux of the microlens 300 is incident and the photoelectric conversion element group 306 that corresponds to the microlens 300, in the ray direction of the microlens 300. In the present embodiment, as an amount of information when a light field image is generated, for example, 5×5 photoelectric conversion elements for one microlens are assumed to be sufficient. It is also assumed that the photoelectric conversion element groups 306 to 311 of FIG. 2A are each constituted by 5×5 photoelectric conversion elements. The same applies to the other microlenses 301 to 305, and the groups 307 to 311 each including 5×5 photoelectric conversion elements respectively correspond to the microlenses 301 to 305.

In the examples of FIGS. 2A and 2B, since the distance A and the aperture value are appropriate, the spreads of the outgoing light fluxes of the microlenses 300 to 305 do not overlap on the image sensor 104 (image capture plane), and each spread corresponds to a group of 5×5 photoelectric conversion elements, which is just right to generate a light field image.

Figure 3A:
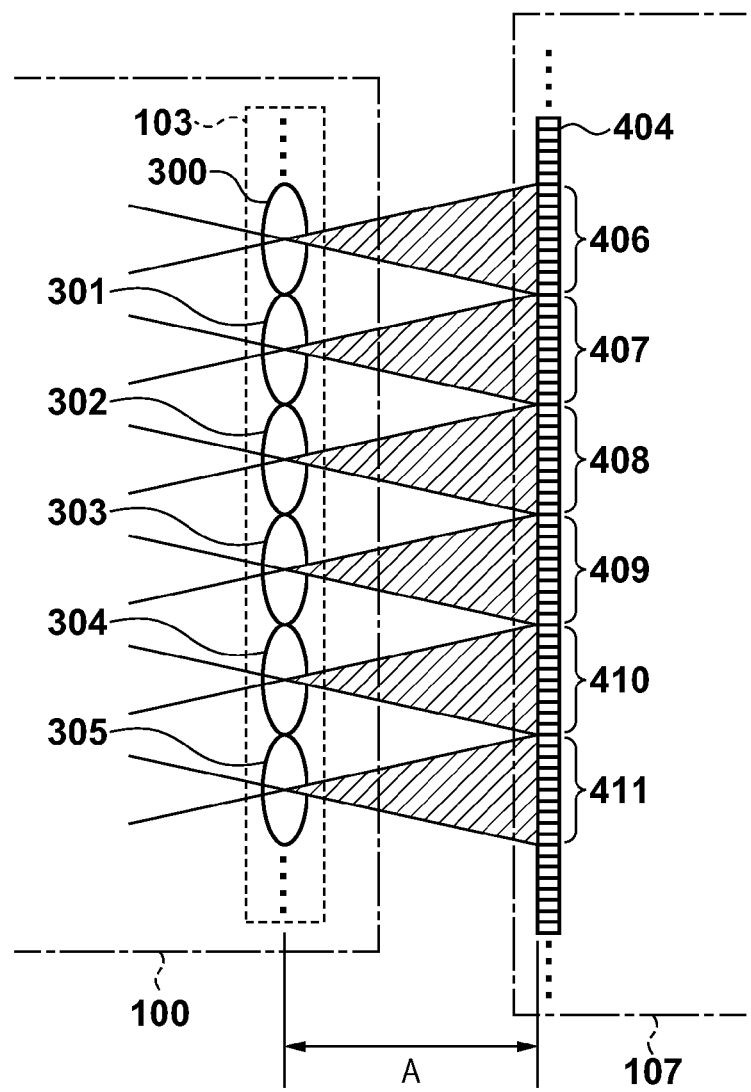
FIGS. 3A and 3B are diagrams that correspond to FIGS. 2A and 2B in the case where an image sensor includes a high density of photoelectric conversion elements.
Figure 3B:
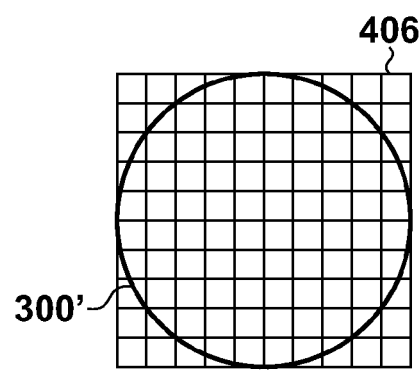

However, in the case where the image sensor 104 has a different configuration, this combination of the distance A and the aperture value is not necessarily appropriate. FIGS. 3A and 3B show, in a similar manner to FIGS. 2A and 2B, the state in which the interchangeable lens 100 of FIGS. 2A and 2B is attached to the main body 107 that includes an image sensor 404 having another configuration.

The main body 107 shown in FIG. 3A includes the image sensor 404 including a higher density of elements than that of the image sensor 104.

Photoelectric conversion element groups 406 to 411 correspond to the microlenses 300 to 305 of the microlens array 103.

In a lens-interchangeable image capture apparatus such as the image capture apparatus according to the present embodiment, interchangeable lenses have compatibility, and thus it is not uncommon for different main bodies to be attached to the same interchangeable lens. Even cameras of the same manufacturer employ various types of image sensors and various densities of photoelectric conversion elements. Every time a new image capture apparatus is released, a change to the specification of an image sensor is likely to occur. The number of pixels and the density of image sensors may differ between image capture apparatuses. Here, in the image sensor 404 of FIG. 3A, the photoelectric conversion elements are arranged in a density that is four times higher than the density of the photoelectric conversion elements of the image sensor 104 of FIG. 2A.

Since the distance A and the aperture value are the same as those in FIG. 2A, an area of a region on the image sensor 404 on which an outgoing light flux of each of the microlenses 300 to 305 is incident is equivalent to that of the configuration of FIG. 2A.

FIG. 3B shows the positional relationship between the microlens 300 and the photoelectric conversion element group 406 that corresponds to the microlens 300. FIG. 3B is a diagram illustrating the positional relationship between the range (spread of the outgoing light flux) 300' on the image sensor 404 on which the outgoing light flux of the microlens 300 is incident, and the photoelectric conversion element group 406 that corresponds to the microlens 300, in the ray direction of the microlens 300. FIG. 3B differs from FIG. 2B in the number of elements in the photoelectric conversion element group 406.

Although the photoelectric conversion element group 306 of FIG. 2B is constituted by 5×5 elements, in the image sensor 404, whose density of elements is four times higher, the photoelectric conversion element group 406 is constituted by 10×10 elements, which is fourfold (see FIG. 3B). In this case, a light field image generated using the image sensor 404 is an image generated by four times more photoelectric conversion elements than the number of photoelectric conversion elements that is necessary and sufficient. For example, assuming that one pixel is generated for one microlens, even if the main body 107 is provided with the image sensor 404 having a more pixel count (more photoelectric conversion elements), only a light field image whose pixel count is equivalent to that of a light field image obtained using a main body provided with the image sensor 104 having a less pixel count can be obtained. That is, irrespective of the density of pixels of the image sensor, the pixel count of the obtained light field image is fixed, and efficiency in the use of the photoelectric conversion elements of the image sensor 404 is low. On the other hand, however, since the number of photoelectric conversion elements for one microlens increases, a range of a refocusable subject distance becomes larger. Also, it is possible to change a point of view, with a higher resolution, by configuring a light field image with photoelectric conversion elements from a specific eye direction of each microlens, or the like.

Figure 4A:
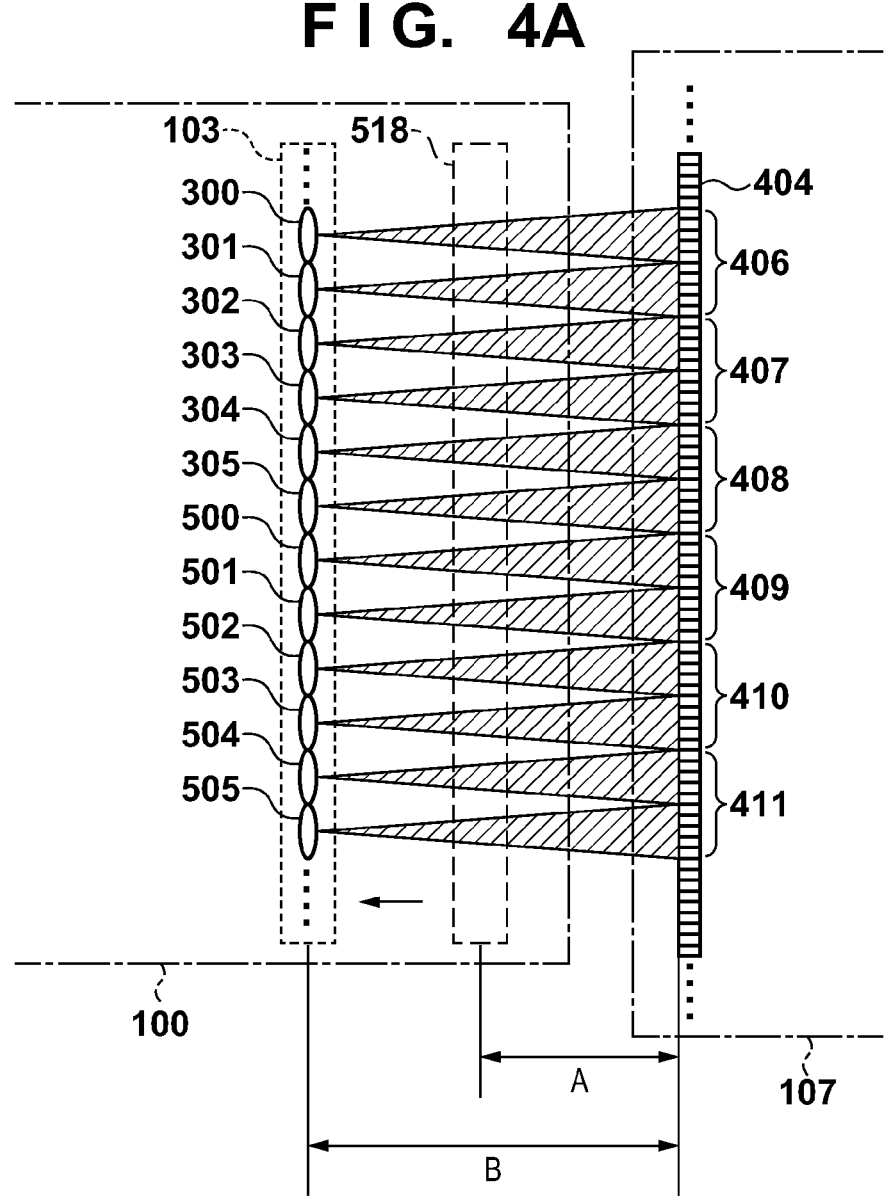
FIGS. 4A and 4B are diagrams illustrating a method for controlling the microlens array and an aperture value according to the first embodiment of the present invention.

FIG. 4A shows a state in which the position of the microlens array 103 and the aperture size of the diaphragm 101 are controlled by the control unit 105 so as to place priority on the resolution of a light field image, serving as an final image, and to achieve efficient use of the image sensor 404. The same reference numerals are given to the same constituent components in FIGS. 2A and 2B.

Microlenses 500 to 505 are microlenses that are present in the same column of the microlenses 300 to 305 and follow on from the microlens 305. Also, a portion enclosed by a dashed line 518 shows the position of the microlens array 103 of FIG. 2A. A distance B is a distance between the centers of the cross sections of the lenses of the microlens array 103 and image sensor 404 in FIG. 4A.

Although, in FIG. 4A, the microlenses 300 to 305 and 500 to 505 are shown in a smaller scale due to the difference in scale between FIG. 4A and FIG. 2A, the size of each microlens is the same as that of the microlens shown in FIG. 2A. A further description in this regard will be given later with reference to FIG. 5. FIG. 4A shows an example in which the microlens array 103 is shifted in a direction away from the image sensor 404 along the optical axis, and the distance between the image sensor 404 and the microlens array 103 changes to the distance B from the distance A.

The control unit 105 determines the distance B upon receipt of information on the density of photoelectric conversion elements of the image sensor 104 and information on the product type of the interchangeable lens 100, and shifts the microlens array 103. The shift of the microlens array 103 may be controlled by the control unit 105 directly controlling a driving source of the microlens array 103, or indirectly instructing a controller of the interchangeable lens 100. The instruction may be a combination of a shift direction and a shift amount, or may be information on the position that corresponds to the distance B.

The distance B is determined by a characteristic value of the microlens array 103 included in the interchangeable lens 100 and a characteristic value of the image sensor 404 installed in the main body 107, and by the predetermined pixel count for one microlens. As described above, for example, the distance B can be set when priority is placed on the resolution of the light field image (image quality priority mode), and the distance A can be set when a user wants to perform refocusing of a large subject distance or make a change in point of view with a high resolution (refocusing priority mode).

Note that as the distance between the image sensor 404 and the microlens array 103 increases, a region on the image sensor 404 on which the outgoing light flux of each microlens is incident is larger. Therefore, when the distance between the microlens array 103 and the image sensor 404 is made larger than the distance A of FIG. 2A without changing the aperture value, interference (cross talk) between outgoing light fluxes of adjacent microlenses occurs.

Therefore, the control unit 105 also controls the diaphragm 101 depending on the position of the microlens array 103, so as to prevent the outgoing light fluxes of the microlenses 300 to 305 and 500 to 505 from interfering with each other. Taking the example of FIG. 3A, the diaphragm 101 is controlled in the direction in which the aperture is reduced (closed) when the distance between the microlens array 103 and the image sensor 404 is made larger than the distance A, and the diaphragm 101 is controlled in the direction in which the aperture is increased (opened) when the distance is made smaller than the distance A. The aperture size of the diaphragm 101 may be changed by the control unit 105 directly controlling a driving source of the diaphragm 101, or indirectly setting the aperture value in the controller of the interchangeable lens 100.

Information on the aperture value that depends on the distance between the microlens array 103 and the image sensor 404 (or the position of the microlens array 103) can be registered in advance in a nonvolatile memory or the like included in the main body 107, as information depending on the product type of the interchangeable lens. Alternatively, the control unit 105 may compute the aperture value using information obtained from the interchangeable lens 100 and information on the image sensor 404.

In the example of FIG. 4A, since the distance B is larger than the distance A (distance B>distance A), the control unit 105 changes the aperture value of the diaphragm 101 to an aperture value that is smaller than the aperture value at the distance A, and makes the aperture of the diaphragm 101 smaller. Note that the number of microlenses of FIG. 4A is larger than that of FIG. 2A, which means that an increased number of microlenses, from among the microlenses that constitute the microlens array 103, receive light.

In the microlens array 103, provision of the microlenses is performed assuming a state in which the light receiving region, which varies depending on the position of the microlens array 103 in the interchangeable lens 100, is at its largest. Since the microlenses 500 to 505, which are not included in the light receiving region in the state of FIG. 2A, are included in the light receiving region due to the shift of the microlens array 103 to the position of FIG. 4A, the number of microlenses is shown as having increased in FIG. 4A. In this manner, the change in the number of (effective) microlenses that receive light depending on the position of the microlens array 103 makes it possible to change the pixel count of the light field image to be generated.

According to the present embodiment, in a mode setting in which priority is placed on the image quality (resolution of the light field image), the position of the microlens array 103 is controlled so that the number of photoelectric conversion elements that correspond to each microlens is constant. Accordingly, as the total number of photoelectric conversion elements of the image sensor 404 increases, the number of microlenses that receive light needs to be increased in accordance therewith.

FIG. 5 is a diagram illustrating a relationship between the positions of the microlens array 103 in an optical axis direction and light receiving regions, and shows a state in which the microlens array 103 is seen in the ray direction. Small circles represent microlenses. An inside circle 700 shown with a dashed line schematically shows a light receiving range of the microlens array 103 at a position that corresponds to the distance A of FIG. 2A. On the other hand, an outside circle 701 shown with a dashed line schematically shows a light receiving range of the microlens array 103 at a position that corresponds to the distance B of FIG. 4A.

As described above, when the microlens array 103 is shifted in the optical axis direction, the area of the light receiving region of the microlens array 103 changes depending on its location. Specifically, the further anterior in the interchangeable lens 100 (the direction opposite to the lens mount) the position of the microlens array 103 is, the larger the light receiving region will be. The microlenses are formed so as to cover the largest light receiving region in a range in which the microlens array 103 can shift. The microlenses 500 to 505 of FIG. 4A are microlenses that are not included in the circle 700, but are present in the portion included in the circle 701.

Figure 4B:
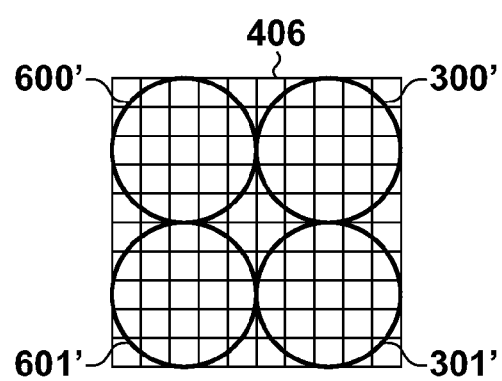

FIG. 4B is a diagram illustrating the positional relationship, in the state of FIG. 4A, between ranges on the image sensor 404 on which the outgoing light fluxes of microlenses (spreads of outgoing light fluxes) are incident and a photoelectric conversion element group that corresponds to the microlenses, in the ray direction of the microlens 300.

In FIG. 4B, 300' and 301' are ranges on the image sensor 404 on which the outgoing light fluxes of the microlenses 300 and 301 are incident. Also, 600' and 601' are ranges on the image sensor 404 on which the outgoing light fluxes of the microlenses that are arranged leftward by one column from the microlenses 300 and 301 (in FIG. 4A, one column behind the drawing plane).

When the microlens array 103 is at the position of the distance A, 10×10 photoelectric conversion elements of the image sensor 404 correspond to one microlens (see FIG. 3B). On the other hand, in FIG. 4B, 5×5 photoelectric conversion elements correspond to one microlens, and thus the number of microlenses that can be covered by 10×10 photoelectric conversion elements is fourfold.

In the present embodiment, since 5×5 photoelectric conversion elements are premised to be sufficient for one pixel of a light field image, it is possible to generate a light field image that has the same quality as those of FIGS. 2A and 2B and whose pixel count is fourfold. Therefore, in the present embodiment, by controlling the position of the microlens array 103 and the aperture size of the diaphragm 101 so that the number of photoelectric conversion elements that correspond to each microlens is constant, efficient use of the photoelectric conversion elements included in the image sensor is realized.

Note that the present embodiment has described the control in the case where the density of the photoelectric conversion elements of the image sensor is increased. In contrast, in the case where the density is decreased, the microlens array 103 is shifted in a direction approaching the image sensor, and the diaphragm 101 is controlled so as to open. In this case, the pixel count of a light field image is reduced relative to the case where the distance is fixed but the number of the photoelectric conversion elements that correspond to microlenses is not decreased, thus allowing the image quality to be maintained.

Second Embodiment

Figure 6:
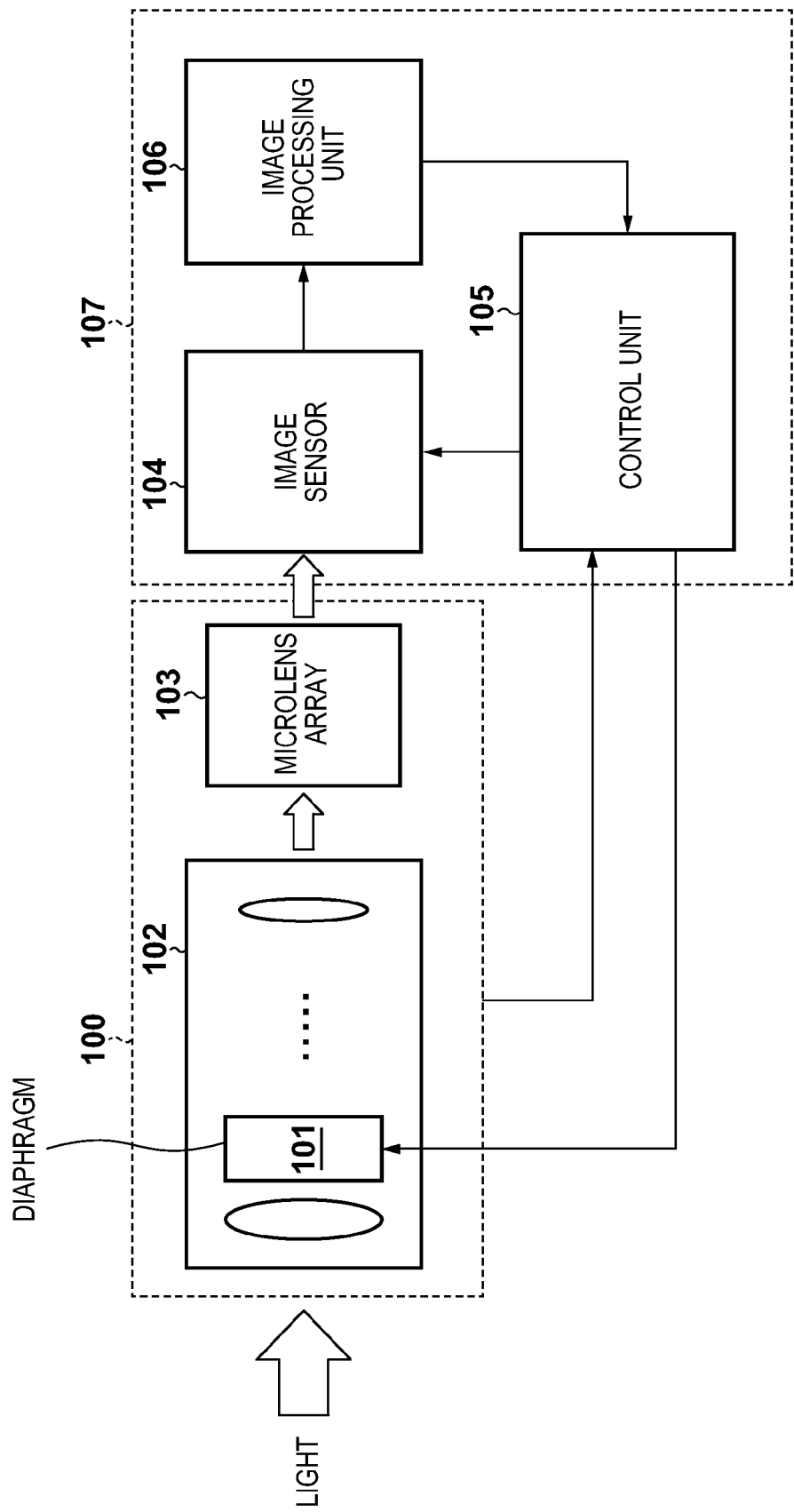
FIG. 6 is a block diagram illustrating an example of a configuration of an image capture apparatus according to a second embodiment of the present invention.

Hereinafter, a second embodiment of the present invention will be described. FIG. 6 is a block diagram illustrating an example of a configuration of an image capture apparatus according to the second embodiment of the present invention, and shows a state in which the traveling direction of light rays is seen from the side. Functional blocks constituting the image capture apparatus according to the present embodiment are common to those of the first embodiment, but operations thereof are different.

The present embodiment differs from the first embodiment in that the microlens array 103 of the interchangeable lens 100 is fixed, and the position of the image sensor 104 is shifted in an optical axis direction. Accordingly, the control unit 105 controls the position of the image sensor 104, instead of the position of the microlens array 103. As described above, the appropriate distance is uniformly determined based on characteristic values of the microlens array 103 and the image sensor 104, and the predetermined pixel count for one microlens, and does not change depending on the state of the apparatus. Therefore, the control unit 105 can determine the appropriate distance by obtaining necessary information from an attached interchangeable lens 100.

Any well-known configuration can be used for a mechanism for shifting the image sensor 104, and the control unit 105 can control the position of the image sensor 104 by controlling a driving source. Also, control of the aperture size of the diaphragm 101 can be performed similarly to that of the first embodiment.

In the present embodiment, the number of photoelectric conversion elements (photoelectric conversion elements that correspond to a microlens) that are used for generating one pixel of a light field image can be fixed. Therefore, independently of the density of the photoelectric conversion elements of the image sensor 104 installed in the main body 107, it is possible to generate, with the same operations, a light field image from which a refocused image can be generated. Also, since no unnecessary photoelectric conversion elements are used, it is possible to prevent an unnecessary load that arises when an image sensor including a high density of the photoelectric conversion elements is used.

The first and second embodiments have described information on the appropriate arrangement of the photographic optical system according to the mode settings when the interchangeable lens for photographing a light field image is attached. The following will describe operations of the main body 107 and the interchangeable lens 100 when the interchangeable lens for photographing a light field image is attached. However, when a conventional interchangeable lens that is for photographing a normal image and does not include a microlens array or the like is attached, the control unit 105 performs neither the pixel manipulation nor the control in the above-described embodiments, and the image capture apparatus operates as a normal conventional image capture apparatus. Specifically, when the interchangeable lens for photographing a light field image is attached, information is needed that indicates in which units (such as the above-described 5×5 or 10×10) the photoelectric conversion elements of the image sensor 104 correspond to one microlens (pixel combination information).

When the main body 107 is turned ON while the interchangeable lens 100 is attached, the control unit 105 obtains above-described lens information from the interchangeable lens 100. Further, in view of information on the current mode setting that was set by an instruction of a user or the like (as to whether priority is placed on the image quality or refocusing) as well, the control unit 105 determines information on the arrangement of the photographic optical system and sets information on the corresponding pixel combination. At that time, according to the configuration of the second embodiment, the control unit 105 shifts the image sensor 104 to an appropriate position in accordance with the information on the arrangement of the photographic optical system. Also, in the actual processing from image capture to recording, the control unit 105 and the image processing unit 106 process the output from the photoelectric conversion elements in accordance with the set pixel combination information.

On the other hand, when power is supplied to the main body 107 for example, the interchangeable lens 100 receives, from the main body 107, a signal requesting lens information, and transmits the lens information to the main body 107. Then, in the configuration of the first embodiment, a control unit that is provided in, for example, the interchangeable lens 100 obtains, from the main body 107, information instructing the position of the microlens array 103 based on the information on arrangement of the photographic optical system, and shifts the microlens array 103 to the corresponding position. Note that a configuration is also possible in which the control unit 105 included in the main body 107 determines the information on the arrangement of photographic optical system, and controls a member for driving the interchangeable lens 100 to shift the microlens array 103 to the corresponding position.

The first and second embodiments have described the operations regarding an interchangeable lens for imaging a light field image. However, in the case where an interchangeable lens for imaging a normal image is attached instead of the interchangeable lens for imaging a light field image, the control unit 105 does not perform the above-described control of the microlens array 103 and the diaphragm 101.

The control unit 105 receives, from the interchangeable lens 100, the lens information that includes information on the product type, and thus if the control unit 105 recognizes that it is not an interchangeable lens for imaging a light field image, the control unit 105 performs not the above-described operations but similar operations to those of the conventional image capture apparatus.

Also, in the first and second embodiments, examples have been described in which 5×5 photoelectric conversion elements for one microlens are necessary and sufficient for generating a light field image, but this is merely an example, and the number of the photoelectric conversion elements may be a value that is less than or more than 5×5.

Although an example in which the control unit 105 is installed in the main body 107 has been described, the control unit 105 may be installed at another position, such as, for example, installing a structure for realizing part of the function of the control unit 105 (CPU or the like) in the interchangeable lens 100.

The exemplary embodiments of the present invention have been described above, but the present invention is not limited to these embodiments, and various modifications and changes are possible within the scope of the claims.

With such configurations, according to the present invention, it is possible to provide an image capture apparatus in which an arrangement relationship between an image sensor and a microlens array that is arranged in front of the image sensor can be varied, and a method for controlling the same.

Note that in the present embodiment, by arranging the microlens array 103 in the vicinity of an imaging plane of a photographic optical system constituted by an optical system as shown in FIGS. 2A and 2B, the image sensor 104 and the pupil plane of the photographic optical system are in a conjugated relationship. However, the arrangement of the photographic optical system and the image sensor is not limited to this. For example, a configuration is also possible in which, in contrast to the optical system of FIGS. 2A and 2B, the light flux from the photographic optical system is imaged on the microlens array so that a plane of a subject is in a conjugated relationship with the image sensor, and the image sensor is provided on this imaging plane. A configuration is also possible in which the light flux from the photographic optical system is re-imaged on the microlens array ("re-imaging" refers to the fact that light flux that has been imaged once and is in the state in which it diffuses is imaged) and the image sensor is provided on this imaging plane.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blue-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-288757, filed on Dec. 28, 2012, which is hereby incorporated by reference herein in its entirety.

What is claimed is:

1. An image capture apparatus having an image sensor in which a plurality of photoelectric conversion elements are arranged, the image capture apparatus comprising:
    an obtaining unit configured to obtain, from a photographic lens that includes a lens array and is attachable to and detachable from the image capture apparatus, information on the photographic lens; and
    a control unit configured to give an instruction to shift the lens array or the image sensor, so that the lens array and the image sensor are arranged at a distance based on the information on the photographic lens, in a state in which the photographic lens is attached,
    wherein the distance between the lens array and the image sensor is determined such that an outgoing light flux from each of lenses that constitute the lens array is incident on a predetermined number of the photoelectric conversion elements of the image sensor, the predetermined number being two or more.

2. The image capture apparatus according to claim 1, wherein the control unit is further configured to control an aperture value based on the information on the photographic lens, in a state in which the photographic lens is attached.

3. The image capture apparatus according to claim 2, wherein the control unit is configured to control the aperture value to a value that prevents outgoing light fluxes of adjacent lenses of the lens array from interfering with each other on the image sensor.

4. The image capture apparatus according to claim 1, wherein the control unit is configured to control the distance such that the number of the photoelectric conversion elements on which an outgoing light flux of each of the lenses that constitute the lens array is incident is constant.

5. The image capture apparatus according to claim 1, wherein the control unit is configured not to perform control of the distance in a state in which a photographic lens that does not include the lens array is attached.

6. The image capture apparatus according to claim 1, wherein the image capture apparatus is capable of generating a light field image from outputs of photoelectric conversion elements on which outgoing light fluxes from the lens array are incident.

7. The image capture apparatus according to claim 1, wherein the image capture apparatus is capable of generating a refocusable image from outputs of photoelectric conversion elements on which outgoing light fluxes from the lens array are incident.

8. A photographic lens that is attachable to and detachable from an image capture apparatus having an image sensor in which a plurality of photoelectric conversion elements are arranged, the photographic lens comprising:
    a lens array that is movable along an optical axis; and
    a transmission unit configured to transmit information on the photographic lens to the image capture apparatus,
    wherein, in a state in which the photographic lens is attached to the image capture apparatus, an outgoing light flux from each of lenses that constitute the lens array is incident on a predetermined number of the photoelectric conversion elements of the image sensor, the predetermined number being two or more.

9. The photographic lens according to claim 8, further comprising:
    a diaphragm; and
    a control unit configured to control, in a state in which the photographic lens is attached to the image capture apparatus, the diaphragm so as to prevent outgoing light fluxes from adjacent lenses of the lens array from interfering with each other on the image sensor.

10. An image capture apparatus having an image sensor in which a plurality of photoelectric conversion elements are arranged, the image capture apparatus comprising:
    an obtaining unit configured to obtain, from a photographic lens that includes a lens array and is attachable to and detachable from the image capture apparatus, information on the photographic lens;
    a setting unit configured to set a photographic mode; and
    a control unit configured to give an instruction to shift the lens array or the image sensor so that the lens array and the image sensor are arranged at a distance according to the photographic mode, in a state in which the photographic lens is attached,
    wherein the distance between the lens array and the image sensor is controlled such that an outgoing light flux from each of lenses that constitute the lens array is incident on the predetermined number of photoelectric conversion elements of the image sensor, the predetermined number being two or more.

11. A method for controlling an image capture apparatus having an image sensor in which a plurality of photoelectric conversion elements are arranged, the method comprising:
    an obtaining step of obtaining, from a photographic lens that includes a lens array and is attachable to and detachable from the image capture apparatus, information on the photographic lens; and
    a controlling step of giving an instruction to shift the lens array or the image sensor so that the lens array and the image sensor are arranged at a distance based on the information on the photographic lens, in a state in which the photographic lens is attached, wherein the distance between the lens array and the image sensor is determined such that an outgoing light flux from each of lenses that constitute the lens array is incident on the predetermined number of photoelectric conversion elements of the image sensor, the predetermined number being two or more.

12. A method for controlling an image capture apparatus having an image sensor in which a plurality of photoelectric conversion elements are arranged, the method comprising:

an obtaining step of obtaining, from a photographic lens that includes a lens array and is attachable to and detachable from the image capture apparatus, information on the photographic lens;

a setting step of setting a photographing mode; and a controlling step of giving an instruction to shift the lens array or the image sensor so that the lens array and the image sensor are arranged at a distance based on the information on the photographic lens, in a state in which the photographic lens is attached, wherein the distance between the lens array and the image sensor is controlled such that an outgoing light flux from each of lenses that constitute the lens array is incident on the predetermined number of photoelectric conversion elements of the image sensor, the predetermined number being two or more.

13. A non-transitory computer readable storage medium that stores a program for causing a computer included in an image capture apparatus to execute the method for controlling an image capture apparatus according to claim 11.

14. A non-transitory computer readable storage medium that stores a program for causing a computer included in an image capture apparatus to execute the method for controlling an image capture apparatus according to claim 12.

15. An image capture system comprising:

an image capture apparatus; and a photographic lens being attachable to and detachable from the image capture apparatus, wherein:

the photographic lens comprises a lens array being movable along an optical axis and, the image capture apparatus comprises:

an image sensor in which a plurality of photoelectric conversion elements are arranged;

an obtaining unit configured to obtain, from the photographic lens, information on the photographic lens; and a control unit configured to give an instruction to shift the lens array or the image sensor, so that the lens array and the image sensor are arranged at a distance based on the information on the photographic lens, in a state in which the photographic lens is attached, wherein the distance between the lens array and the image sensor is determined such that an outgoing light flux from each of lenses that constitute the lens array is incident on a predetermined number of the photoelectric conversion elements of the image sensor, the predetermined number being two or more.

16. A lens accessory that is attachable to and detachable from an image capture apparatus having an image sensor in which a plurality of photoelectric conversion elements are arranged, the lens accessory comprising:

a lens array that is movable along an optical axis; and a communication unit configured to communicate with the image capture apparatus, wherein, in a state in which the lens accessory is attached to the image capture apparatus, an outgoing light flux from each of lenses that constitute the lens array is incident on a predetermined number of the photoelectric conversion elements of the image sensor, the predetermined number being two or more.

17. The lens accessory according to claim 16, further comprising:

a diaphragm; and a control unit configured to control, in a state in which the lens accessory is attached to the image capture apparatus, the diaphragm so as to prevent outgoing light fluxes from adjacent lenses of the lens array from interfering with each other on the image sensor.

18. The lens accessory according to claim 16, further comprising a photographic lens.

* * * * *